United States Patent
Handrich

(10) Patent No.: US 7,340,954 B2
(45) Date of Patent: Mar. 11, 2008

(54) METHOD FOR MEASUREMENT OF ROTATION RATES/ACCELERATIONS USING A ROTATION RATE CORIOLIS GYRO, AS WELL AS A CORIOLIS GYRO WHICH IS SUITABLE FOR THIS PURPOSE

(75) Inventor: Eberhard Handrich, Kirchzarten (DE)

(73) Assignee: LITEF GmbH, Freiburg (DE)

( * ) Notice: Subject to any disclaimer, the term of this patent is extended or adjusted under 35 U.S.C. 154(b) by 0 days.

(21) Appl. No.: 10/584,339

(22) PCT Filed: Nov. 26, 2004

(86) PCT No.: PCT/EP2004/013446

§ 371 (c)(1),
(2), (4) Date: Jun. 23, 2006

(87) PCT Pub. No.: WO2005/066584

PCT Pub. Date: Jul. 21, 2005

(65) Prior Publication Data

US 2007/0144254 A1    Jun. 28, 2007

(30) Foreign Application Priority Data

Dec. 23, 2003 (DE) ................... 103 60 963

(51) Int. Cl.
*G01C 19/56* (2006.01)

(52) U.S. Cl. .................. 73/504.04; 73/504.12; 73/504.14

(58) Field of Classification Search ........... 73/504.12, 73/504.14, 594.16, 504.02, 504.04, 504.15, 73/514.32, 514.36, 514.38, 514.16
See application file for complete search history.

(56) References Cited

U.S. PATENT DOCUMENTS

| 6,067,858 | A | 5/2000 | Clark et al. |
| 6,934,665 | B2* | 8/2005 | Rober ................. 702/189 |
| 7,159,460 | B2* | 1/2007 | Nicu et al. ............... 73/504.12 |

FOREIGN PATENT DOCUMENTS

| DE | 4442033 | 5/1996 |
| DE | 10107327 | 8/2001 |
| EP | 1253399 | 10/2002 |
| EP | 1359391 | 11/2003 |
| WO | 0216871 | 2/2002 |
| WO | 02066927 | 8/2002 |
| WO | 03014669 | 2/2003 |

OTHER PUBLICATIONS

Article: Geiger et al., "New Designs of Micromachined Vibrating Rate Gyroscopes with Decoupled Oscillation Modes", *1997 International Conference on Solid-State Sensors and Actuators* (Chicago Jun. 16-19, 1997), pp. 1129-1132.

* cited by examiner

*Primary Examiner*—Helen Kwok
(74) *Attorney, Agent, or Firm*—Elliott N. Kramsky

(57) ABSTRACT

A Coriolis gyro includes a first and a second resonator, each in the form of a coupled system comprising first and second linear oscillators. The first resonator can be caused to oscillate in antiphase with respect to the second resonator along a common oscillation axis. A system coupled in this way has the advantage that it is possible to measure rotation rate and acceleration simultaneously, with insensitivity to disturbances (e.g., externally or internally acting vibrations).

4 Claims, 4 Drawing Sheets

METHOD FOR MEASUREMENT OF ROTATION RATES/ACCELERATIONS USING A ROTATION RATE CORIOLIS GYRO, AS WELL AS A CORIOLIS GYRO WHICH IS SUITABLE FOR THIS PURPOSE

BACKGROUND

1. Field of the Invention

The present invention relates to Coriolis gyroscopes. More particularly, the invention pertains to a method for measurement of accelerations with a rotation rate Coriolis gyro, and to a Coriolis gyro suitable for such purpose.

2. Description of the Prior Art

Coriolis gyros (also referred to as "vibration gyros") are increasingly employed for navigation. Such devices include a mass system that is caused to oscillate. The mass system generally has a large number of oscillation modes, initially independent of one another. A specific oscillation mode of the mass system is artificially excited to operate the Coriolis gyro. Such mode is referred to in the following text as the "excitation oscillation".

Coriolis forces occur that draw energy from the excitation oscillation of the mass system when the Coriolis gyro is rotated and transmit a further oscillation mode of the mass system (referred to below as the "read oscillation"). The read oscillation is tapped off to determine rotations of the Coriolis gyro, and a corresponding read signal is investigated to determine whether any changes have occurred in the amplitude of the read oscillation which represent a measure of rotation of the Coriolis gyro.

Coriolis gyros may comprise either an open-loop or a closed-loop system. In a closed-loop system, the amplitude of the read oscillation is continuously reset to a fixed value (preferably zero) via respective control loops, and the resetting forces measured.

The mass system of the Coriolis gyro (referred to below as the "resonator") may be of widely differing designs. For example, it is possible to use an integral mass system. Alternatively, it is possible to split the mass system into separate oscillators coupled to one another via a spring system and capable of movements relative to one another. High dimensional accuracies can be achieved, particularly with linear double-oscillator systems that comprise a coupled system of two linear oscillators. In double-oscillator systems, the spring system that couples the linear oscillators to one another is, in general, designed so that the two linear oscillators can be caused to oscillate along a first oscillation axis, with the second oscillator additionally oscillating along a second oscillation axis at right angles to the first oscillation axis. In such case, the movements of the second oscillator along the second oscillation axis can be regarded as a read oscillation while those of the first and second oscillators along the first oscillation axis can be regarded as an excitation oscillation.

Linear double-oscillator systems have the disadvantage that the oscillations of the two linear oscillators along the first oscillation axis can cause vibrations or reflections in the gyro frame. (The "gyro frame" should be understood to be a mechanical, non-oscillating structure in which the oscillators are "embedded", e.g. a non-oscillating part of a silicon wafer.) The vibrations or reflections in the gyro frame can, in turn, lead to disturbances (e.g. damping effects) to oscillator movements. For example, the oscillations of the first and second linear oscillators along the first oscillation axis can be disturbed by both external vibrations and accelerations which act along the first oscillation axis. Analogously, external vibrations and accelerations acting in the direction of the second oscillation axis can disturb the oscillations of the second linear oscillator along that oscillation axis to corrupt the measured rotation rate—in precisely the same way as all of the other disturbance influences mentioned.

SUMMARY AND OBJECTS OF THE INVENTION

It is therefore an object of the present invention to provide a Coriolis gyro in which any disturbance of the read oscillation (i.e. of the oscillation of the second linear oscillator in the direction of the second oscillation axis) as a result of disturbance influences can be largely avoided.

The present invention addresses the preceding and other objects by providing, in a first aspect, a Coriolis gyro. Such gyro has a first and a second resonator, each in the form of a coupled system comprising a first and a second linear oscillator. The first resonator is mechanically/electrostatically connected/coupled to the second resonator such that the two resonators can be caused to oscillate in antiphase with respect to one another along a common oscillation axis.

In a second aspect, the invention provides a method for selective or simultaneous measurement of rotation rates and accelerations with a rotation rate Coriolis gyro that has a first and a second resonator. The resonators are in the form of a coupled system comprising a first and a second linear oscillator. Rotation rates are determined by tapping and evaluation of the deflections of the second oscillators.

In such method, the two resonators are caused to carry out oscillations in antiphase with one another along a common oscillation axis. The deflections of the second oscillators are compared with one another to determine an antiphase deflection component that is a measure of the rotation rate to be measured and/or to determine a common in-phase deflection component, which is a measure of the acceleration to be measured. The rotation rate/acceleration to be measured is then calculated from the in-phase deflection component/anti-phase deflection component.

The preceding and other features of the invention will become further apparent from the detailed description that follows. Such description is accompanied by a set of drawing figures. Numerals of the drawing figures, corresponding to those of the written description, point to the features of the invention with like numerals referring to like features of the invention throughout.

DETAILED DESCRIPTION OF THE PREFERRED EMBODIMENT

Figure 1:
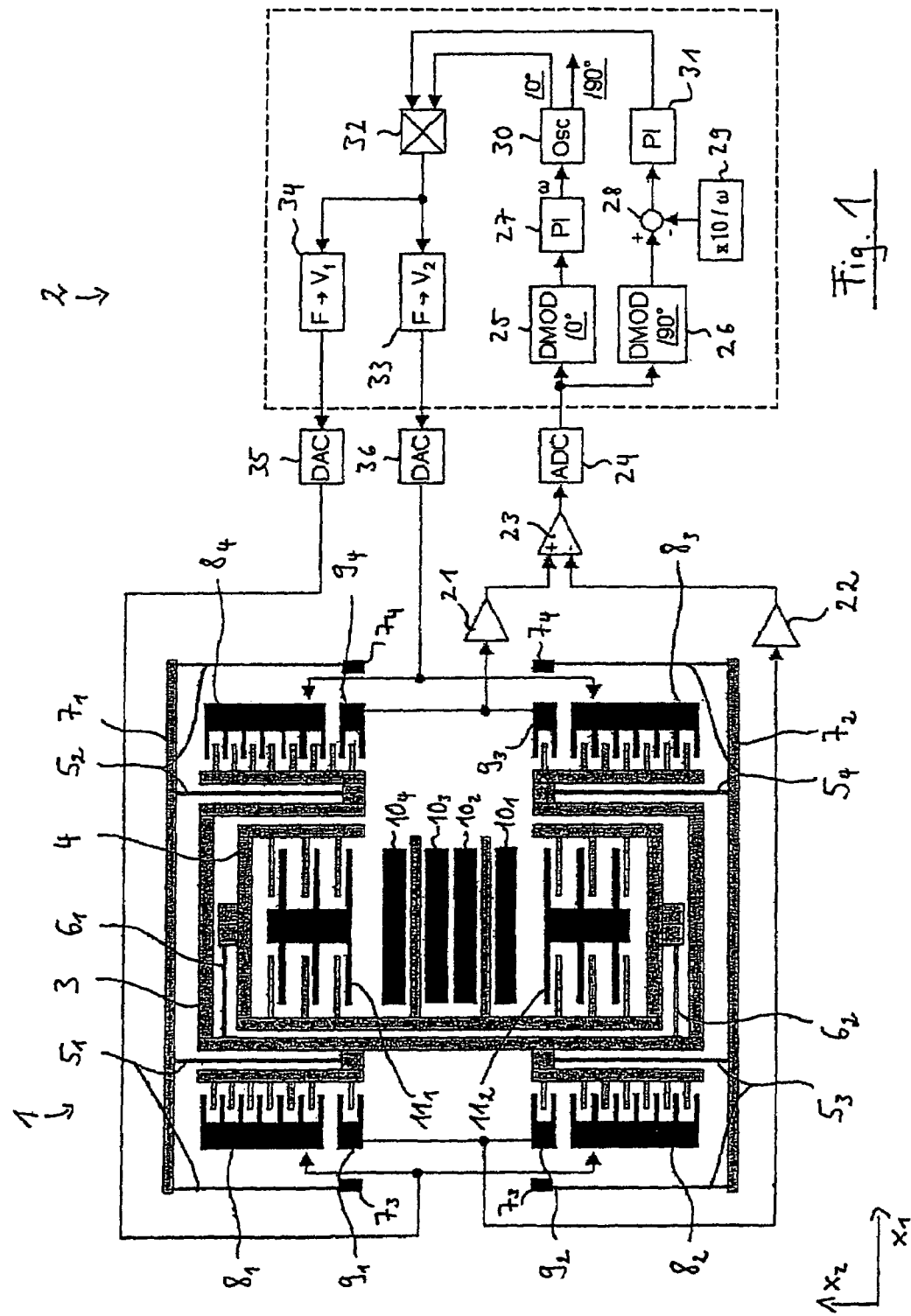
FIG. 1 is a schematic illustration of one possible embodiment of a mass system having two linear oscillators, with corresponding control loops, for exciting the first oscillator.

A Coriolis gyro according to the invention has a mass system that comprises two double-oscillator systems (i.e. two resonators) or four linear oscillators. Antiphase oscillations of the two resonators with respect to one another result in the center of gravity of the mass system remaining stationary if the two resonators are designed appropriately. This results in the oscillation of the mass system producing no external vibrations that would result in disturbances in the form of damping/reflections. External vibrations and accelerations in the direction of the common oscillation axis have no influence on the antiphase movement of the two resonators along the common oscillation axis.

The first resonator can be coupled to the second resonator, (e.g. via a spring system that connects the first resonator to the second resonator). A further possibility is to couple the first resonator to the second resonator via an electrostatic field. Both types of coupling may be used either exclusively or in combination. It is sufficient, for example, for both resonators to be formed on a common substrate so that mechanical coupling is replaced by a mechanical connection provided by the common substrate.

The configurations of the first and second resonators are preferably identical in mass and shape. The two resonators may be arranged axially symmetrically with respect to one another with reference to an axis of symmetry at right angles to the common oscillation axis. That is, the first resonator is mapped by the axis of symmetry onto the second resonator. The invention is not restricted to this and it is sufficient for the two resonators to have the same mass, but to be designed with different shapes.

As mentioned, the coupled resonators are designed so that both linear oscillators of a resonator can be caused to oscillate in antiphase along a first oscillation axis (excitation oscillation). The second linear oscillator can additionally be caused to oscillate along a second oscillation axis (read oscillation). If the first and second oscillation axes are at right angles to one another, and both resonators are caused to oscillate in antiphase with respect to one another along the first oscillation axis (common oscillation axis), then the second oscillators are deflected in the opposite direction during rotation of the Coriolis gyro (antiphase deflection). In contrast, during acceleration of the Coriolis gyro, the second linear oscillators are deflected in the same direction (in-phase deflection). It is thus possible to measure accelerations or rotations selectively. The acceleration is measured by evaluation of an in-phase oscillation, and rotation rate is measured by evaluation of an antiphase oscillation. The expressions "in-phase" and "antiphase" have the following meanings: if the coordinates in the excitation direction are denoted x and those in the read direction are denoted y, then $x_1=x_2$, $y_1=y_2$ for in-phase oscillation and $x_1=-x_2$, $y_1=-y_2$ for antiphase oscillation (in this case, the index "1" denotes the first oscillator, and the index "2" the second oscillator).

The common in-phase deflection component is determined advantageously as follows: a first quadrature bias within the first resonator and a second quadrature bias within the second resonator are determined. The first and the second quadrature biases are then added and subtracted to determine a common quadrature bias component (in-phase component) and a difference quadrature bias component (antiphase component). The common quadrature bias component is proportional to the acceleration to be measured and corresponds to the common in-phase deflection component. The difference quadrature bias component (difference) corresponds to the antiphase deflection component. Rotation rate can thus be measured at the same time as acceleration, via the difference quadrature bias component.

In order to assist understanding of the acceleration measurement principle described above, the physical principles of a Coriolis gyro will be briefly explained again below using the example of a linear double-oscillator system. In general, Coriolis gyros have a quadrature bias (i.e., a zero error). The quadrature bias is composed of a plurality of quadrature bias components. One of these components arises from alignment errors of the first and second linear oscillator with respect to one another, with such alignment errors being unavoidable due to manufacturing tolerances. The alignment errors between the two oscillators produce a zero error in the measured rotation rate signal.

The Coriolis force can be represented as:

$$\vec{F} = 2m\vec{v}_s \times \vec{\Omega} \quad [1]$$

$\vec{F}$ Coriolis force
m Mass of the oscillator
$\vec{v}_s$ Velocity of the oscillator
$\vec{\Omega}$ Rotation rate If the mass that reacts to the Coriolis force is equal to the oscillating mass, and the oscillator is operated at the natural frequency ω, then:

$$2m\vec{v}_s \times \vec{\Omega} = m\vec{a}_c \quad [2]$$

The oscillator velocity is given by:

$$\vec{v}_s = \vec{v}_{s0} \sin \omega t \quad [3]$$

where
$\vec{v}_{s0}$ oscillator amplitude
ω natural frequency of the oscillator

The oscillator and Coriolis accelerations are thus given by:

$$\vec{a}_s = \vec{v}_{s0} \omega \cos \omega t$$

$$\vec{a}_c = 2\vec{v}_{s0} \sin \omega t \times \vec{\Omega}$$

The two acceleration vectors are thus spatially at right angles to one another and are offset through 90° with respect to one another in the time function (spatial and time orthogonality).

These two criteria can be employed to separate oscillator acceleration $\vec{a}_s$ from the Coriolis acceleration $\vec{a}_c$. The ratio of the abovementioned acceleration amplitudes $a_c$ and $a_s$ is:

$$\frac{a_c}{a_s} = \frac{2\Omega}{\omega} \quad [5]$$

If the rotation rate is $\Omega=5°/h$ and the natural frequency of the oscillator is $f_s=10$ KHz, then:

$$\frac{a_c}{a_s} = 7.7 \cdot 10^{-10} \quad [6]$$

For an accuracy of 5°/h, undesirable couplings of the first oscillator to the second oscillator must not exceed $7.7 \cdot 10^{-10}$, or must be constant. If a mass system composed of two linear oscillators coupled to one another via spring elements is employed, then the accuracy of the spatial orthogonality between the oscillation mode and the measurement mode is limited due to the alignment error of the spring elements. Achievable accuracy (limited by manufacturing tolerances) is $10^{-3}$ to $10^{-4}$. Time orthogonality accuracy is limited by the phase accuracy of the electronics at, for example, 10 KHz, which can likewise be complied with only to at most $10^{-3}$ to $10^{-4}$. This means that the ratio of the accelerations as defined above cannot be satisfied.

Realistically, the resultant error in the measured acceleration ratio $a_c/a_s$ is:

$$\frac{a_c}{a_s} = 10^{-6} \text{ to } 10^{-8} \quad [7]$$

The spatial error results in a so-called quadrature bias $B_Q$, which, together with the time phase error $\Delta_\Phi$, results in a bias B:

$B_Q = 6.5 \cdot 10^{6\circ}/h$ to $6.5 \cdot 10^{5\circ}/h$ $\Delta_\Phi = 10^{-3}$ to $10^{-4}$ $B = B_Q \cdot \Delta_\Phi = 6,500°/h$ to $65°/h$ \quad [8]

The quadrature bias thus results in a major limitation to measurement accuracy. In this case, it should be noted that the preceding error analysis takes account only of the direct coupling of the oscillation mode to the read mode. Further quadrature bias components also exist and occur, for example, as a result of couplings with other oscillation modes.

If the Coriolis gyro is designed so that the first oscillators are connected by first spring elements to a gyro frame of the Coriolis gyro, and the second oscillators are connected by second spring elements to one of the first oscillators, then the acceleration to be measured results in a change in the mutual alignment of the first oscillators with respect to the second oscillators. This is particularly manifested in a change in alignment of the second spring elements. The alignment change of the second spring elements in such case produces an "artificial" quadrature bias component (i.e., an "error") in the quadrature bias signal. It is thus also indirectly possible to use the determination of the quadrature bias to deduce the acceleration to be measured, which produces the corresponding "artificial" quadrature bias component.

The alignments of the first and second spring elements are preferably at right angles to one another. The spring elements may have any desired shape. The expression "first quadrature bias" and "second quadrature bias" preferably mean the total quadrature bias of a resonator. It is also possible in the acceleration measurement method according to the invention to determine only one quadrature bias component in each resonator. In such case the determined quadrature bias component must include at least the component produced by the acceleration to be measured or the rotation to be measured.

The Coriolis gyro preferably has a device for determination of first rotation rate and quadrature bias signals that occur within the first resonator, and second rotation rate and quadrature bias signals that occur within the second resonator. Furthermore, the Coriolis gyro may have a device for production of electrostatic fields, by means of which the alignment angle of the first spring elements with respect to the gyro frame can be varied and/or the alignment angle of the second spring elements can be varied with respect to the first oscillators. The alignment/strength of the electrostatic fields can then be regulated by provision of appropriate control loops so that the first and the second quadrature bias are in each case as small as possible. A computation unit can use the first and second rotation rate/quadrature bias signals to determine the rotation rate, and an in-phase component of the electrostatic fields which compensate for the first and second quadrature biases, to deduce the acceleration to be measured.

The quadrature bias is thus preferably eliminated at its point of origin. Mechanical alignment errors of the two oscillators with respect to one another and changes in the mutual alignment of the two oscillators caused by the acceleration/rotation to be measured are compensated by an electrostatic force produced by the electrostatic field that acts on one or both oscillators. This type of quadrature bias compensation has the advantage that both rotation rates and accelerations can be determined with increased measurement accuracy.

In one preferred embodiment, the electrical fields change the alignment angles of the first and second spring elements to make the alignments of the first and second spring elements orthogonal to one another. Orthogonalization results in compensation for the quadrature bias (component) produced. Further contributions to the quadrature bias are used to set the error angle with respect to orthogonality so that the overall quadrature bias disappears. The alignment angles of the second spring elements with respect to the first oscillator are preferably varied by the electrostatic field, and the alignment angles of the first spring elements with respect to the gyro frame of the Coriolis gyro are not changed. It is also possible to use the electrostatic field to vary only the alignment angles of the first spring elements or to vary the alignment angles of both the first and second spring elements.

One preferred embodiment of a Coriolis gyro according to the invention has:

an ("overall") resonator, which is in the form of a system comprising two coupled first (linear) oscillators ("sub-resonators") excited in antiphase and each containing a second linear read oscillator, a device for production of at least one electrostatic field, by means of which the alignment of the two coupled first oscillators with respect to the second (read) oscillators can be varied, a device for determination of the quadrature biases of the read oscillators that are caused by alignment errors of the two oscillators with respect to the excitation oscillator and further coupling mechanisms, a control loop which in each case regulates the intensity of the at least one electrostatic field by means of at least one corresponding control signal such that the determined quadrature biases are as small as possible, a computation unit, which in each case forms differences and sums of the at least one control signal and uses them to determine the rotation rate and the acceleration.

In principle, it is possible to calculate accelerations and rotation rates solely on the basis of the determined quadrature biases. It is not absolutely essential to compensate for the first and second quadrature bias to determine the quadrature biases. However, this is advisable for measurement accuracy, as phase tolerances results in mixing the rotation rate and the quadrature with one another. The invention covers both alternatives.

It has also been found advantageous for each of the second oscillators to be attached to or clamped on the first oscillator "at one end" in the resonators. "Clamped in at one end" can be understood not only in the sense of the literal wording but also in a general sense. In general, attached or clamped in at one end means that the force is introduced from the first oscillator to the second oscillator essentially from one "side" of the first oscillator. If, for example, the oscillator system were to be designed in such a way that the second oscillator were bordered by the first oscillator and connected to it by second spring elements, then the expression clamped in or attached at one end would imply the following: the second oscillator is readjusted for the movement by the first oscillator, by the first oscillator alternately "pushing" or "pulling" the second oscillator by means of the second spring elements.

Clamping the second oscillator in at one end on the first oscillator has the advantage that, when an electrostatic force is exerted on the second oscillator as a result of the alignment/position change of the second oscillator, the second spring elements can be slightly curved, thus making it possible, without any problems, to vary the corresponding alignment angle of the second spring elements. If the second oscillator were to be attached to additional second spring elements so that during movement of the first oscillator, the second oscillator were at the same time to be "pulled" and "pushed" by the second spring elements, then this would be equivalent to the second oscillator being clamped in or attached "at two ends" to the first oscillator (with the force being introduced to the second oscillator from two opposite ends of the first oscillator). In such case, the additional second spring elements would produce corresponding opposing forces when an electrostatic field is applied, so that changes in the alignment angles of the second spring elements could be achieved only with difficulty. However, clamping in at two ends is acceptable when the additional second spring elements are designed so that the influence of these spring elements is small so that all of the spring elements can bend without any problems. That is, the clamping in is effectively at one end.

Depending on the design of the oscillator, clamping in at one end can be effectively provided just by the "influence" (force introduction) of the additional second spring elements being 40% or less. However, this value does not present any limitation on the invention. It is also feasible for the influence of the second spring elements to be more than 40%. For example, clamping in at one end can be achieved by all of the second spring elements that connect the second oscillator to the first oscillator being arranged parallel and on the same plane. All start and end points of the second spring elements are in each case attached to the same ends of the first and second oscillator. The start and end points of the second spring elements may each advantageously be on a common axis, with the axes intersecting the second spring elements at right angles.

If the second oscillator is attached to or clamped on the first oscillator at one end, then the first spring elements are preferably designed to clamp the first oscillator in on the gyro frame at two ends (the expressions "at one end" and "at two ends" can be used analogously). As an alternative, however, it is possible for the spring elements also to be designed to clamp in the first oscillator at one end. For example, all the first spring elements that connect the first oscillator to the gyro frame of the Coriolis gyro can be arranged parallel and on the same plane as one another, with the start and end points of the first spring elements in each case preferably being located on a common axis. It is equally possible for the spring elements to be designed so that the first oscillator is clamped in on the gyro frame at one end, and the second oscillator is clamped in at two ends by the first oscillator. It is also possible for both oscillators to be clamped in at two ends. For quadrature bias compensation, it has been found to be advantageous for at least one of the two oscillators to be clamped in at one end.

FIG. 1 illustrates the schematic design of a linear double oscillator 1 with corresponding electrodes including a block diagram of associated evaluation/excitation electronics 2. The linear double oscillator 1 is preferably produced by etching a silicon wafer. It has a first linear oscillator 3, a second linear oscillator 4, first spring elements $5_1$ to $5_4$, second spring elements $6_1$ and $6_2$ as well as parts of an intermediate frame $7_1$ and $7_2$ and a gyro frame $7_3$ and $7_4$. The second oscillator 4 is mounted within the first oscillator 3 to oscillate, and is connected to it via the second spring elements $6_1$, $6_2$. The first oscillator 3 is connected to the gyro frame $7_3$, $7_4$ by the first spring elements $5_1$ to $5_4$ and the intermediate frame $7_1$, $7_2$.

First excitation electrodes $8_1$ to $8_4$, first read electrodes $9_1$ to $9_4$, second excitation electrodes $10_1$ to $10_4$, and second read electrodes $11_1$ and $11_2$ are also provided. All of the electrodes are mechanically connected to the gyro frame, although electrically isolated. (The expression "gyro frame" refers to a mechanical, non-oscillating structure in which the oscillators are "embedded", e.g., the non-oscillating part of the silicon wafer).

When the first oscillator 3 is excited by the first excitation electrodes $8_1$ to $8_4$ to oscillate in the X1 direction, such movement is transmitted through the second spring elements $6_1$, $6_2$ to the second oscillator 4 (alternate "pulling" and "pushing"). The vertical alignment of the first spring elements $5_1$ to $5_4$ prevents the first oscillator 3 from moving in the X2 direction. However, vertical oscillation can be carried out by the second oscillator 4 as a result of the horizontal alignment of the second spring elements $6_1$, $6_2$. When corresponding Coriolis forces occur, then the second oscillator 4 is excited to oscillate in the X2 direction.

A read signal that is read from the first read electrodes $9_1$ to $9_4$ and proportional to the amplitude/frequency of the X1 movement of the first oscillator 3 is supplied, via appropriate amplifier elements 21, 22 and 23, to an analog/digital converter 24. An appropriately digitized output signal from the analog/digital converter 24 is demodulated by a first demodulator 25 and by a second demodulator 26 to form corresponding output signals, with the two demodulators operating with an offset of 90° with respect to one another. The output signal from the first demodulator 25, whose output signal controls a frequency generator 30 so that the signal occurring downstream from the demodulator 25 is regulated at zero, is supplied to a first regulator 27 to regulate the frequency of the excitation oscillation (the oscillation of the mass system 1 in the X1 direction). Analogously, the output signal from the second demodulator 26 is regulated at a constant value (predetermined by the electronics component 29). A second regulator 31 insures that the amplitude of the excitation oscillation is regulated. The output signals from the frequency generator 30 and the amplitude regulator 31 are multiplied by one another at a multiplier 32. An output signal from the multiplier 32, proportional to the force to be applied to the first excitation electrodes $8_1$ to $8_4$, acts not only on a first force/voltage converter 33 but also on a second force/voltage converter 34, which use the digital force signal to produce digital voltage signals. The digital output signals from the force/voltage converters 33, 34 are converted by first and second digital/analog converters 35, 36 to corresponding analog voltage signals. Such signals are then passed to the first excitation electrodes $8_1$ to $8_4$. The first and second regulators 27, 31 readjust the natural frequency of the first oscillator 3 and set the amplitude of the excitation oscillation to a specific, predeterminable value.

Figure 2:
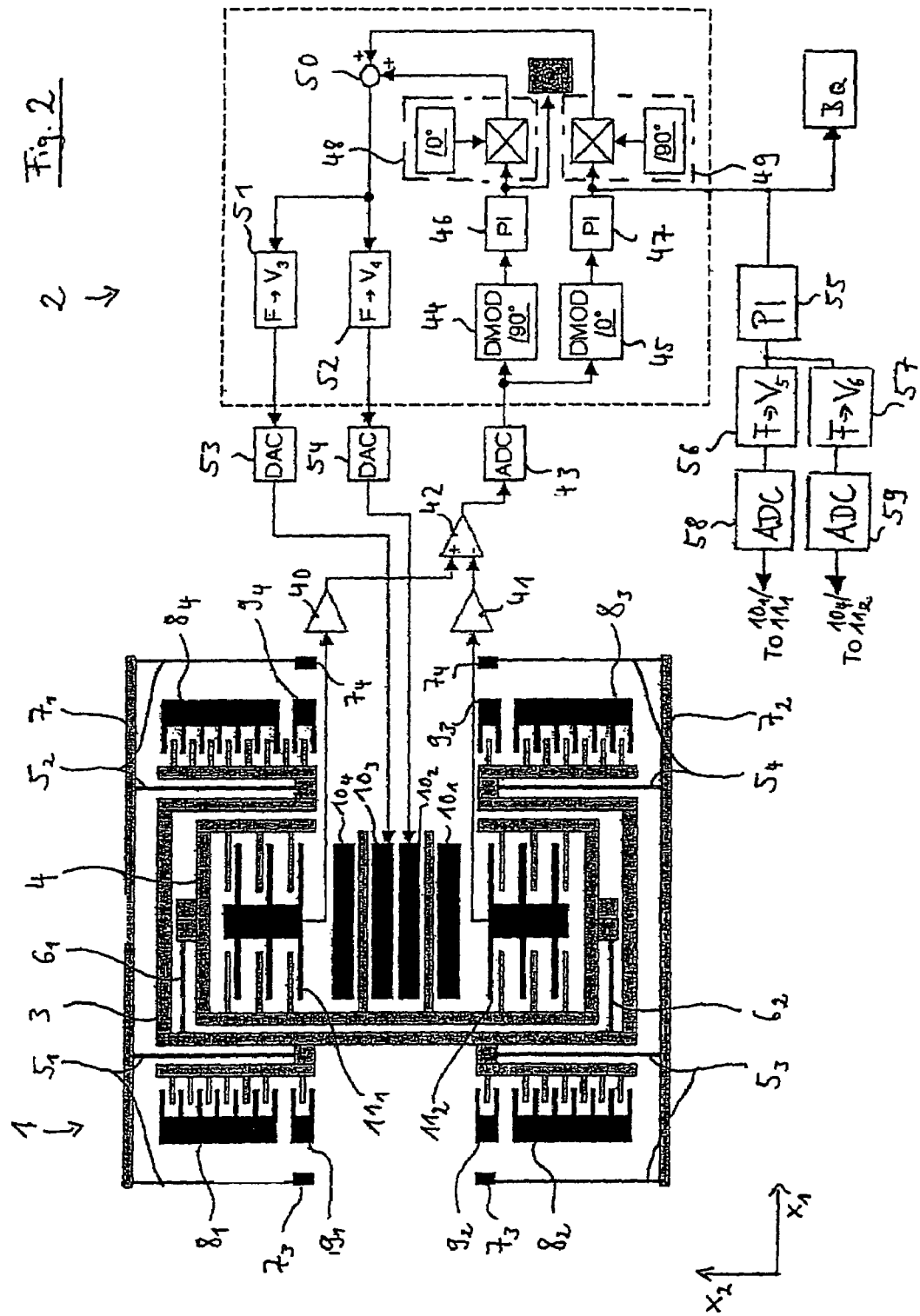
FIG. 2 is a schematic illustration of a possible embodiment of a mass system having two linear oscillators with corresponding measurement and control loops for a rotation rate Ω and a quadrature bias $B_Q$, as well as auxiliary control loops for compensation of the quadrature bias $B_Q$.

When Coriolis forces occur, resultant movement of the second oscillator 4 in the X2 direction (read oscillation) is detected by the second read electrodes $11_1$, $11_2$, and a read signal, proportional to the movement of the read oscillation, is supplied via appropriate amplifier elements 40, 41 and 42 to an analog/digital converter 43 (see FIG. 2). A digital output signal from the analog/digital converter 43 is demodulated by a third demodulator 44 in phase with the direct-bias signal and demodulated by a fourth demodulator 45, offset through 90°. A corresponding output signal from the first demodulator 44 is applied to a third regulator 46, whose output signal is a compensation signal that corresponds to the rotation rate $\Omega$ to be measured. An output signal from the fourth demodulator 45 is applied to a fourth regulator 47 whose output signal is a compensation signal proportional to the quadrature bias to be compensated. The output signal from the third regulator is modulated by a first modulator 48, and the output signal from the fourth regulator 47 is modulated in an analogous manner by a second modulator 49, so that amplitude-regulated signals are produced whose frequencies correspond to the natural frequency of the oscillation in the X1 direction (sin≅0°, cos≅90°). Corresponding output signals from the modulators 48, 49 are added in an addition stage 50, whose output signal is supplied both to a third force/voltage converter 51 and to a fourth force/voltage converter 52. The corresponding output signals for the force/voltage converters 51, 52 are supplied to digital/analog converters 53, 54, whose analog output signals are applied to the second excitation electrodes $10_2$ to $10_3$, and reset the oscillation amplitudes of the second oscillator 4.

The electrostatic field produced by the second excitation electrodes $10_1$ and $10_4$ (or the two electrostatic fields produced by the electrode pairs $10_1$, $10_3$ and $10_2$, $10_4$) results in an alignment/position change of the second oscillator 4 in the X2 direction, and thus in a change in the alignments of the second spring elements $6_1$, to $6_2$. The fourth regulator 47 regulates the signal applied to the second excitation electrodes $10_1$ and $10_4$ so that the quadrature bias included in the compensation signal of the fourth regulator 47 is as small as possible, or disappears. A fifth regulator 55, a fifth and a sixth force/voltage converter 56, 57 and two analog/digital converters 58, 59 are used for this purpose.

The output signal from the fourth regulator 47, which is a measure of the quadrature bias, is supplied to the fifth regulator 55, that regulates the electrostatic field produced by the two excitation electrodes $10_1$ and $10_4$ so that the quadrature bias $B_Q$ disappears. An output signal from the fifth regulator 55 is supplied to the fifth and sixth force/voltage converters 56, 57 for this, employing the digital force/output signal from the fifth regulator 55 to produce digital voltage signals that are then converted to analog voltage signals in the analog/digital converters 58, 59. The analog output signal from the analog/digital converter 58 is supplied to the second excitation electrode $10_1$ (alternatively to electrode $11_1$). The analog output signal from the analog/digital converter 59 is supplied to the second excitation electrode $10_4$ (alternatively to electrode $11_2$).

As the second oscillator 4 is clamped only by the second spring elements $6_1$ to $6_2$ (clamped at one end), such alignment of the spring elements can be varied without problem by the electrostatic field. It is additionally possible to provide additional second spring elements, resulting in the second oscillator 4 being clamped at two ends, provided that such additional elements are appropriately designed to insure that clamping at one end is effective. In order to permit the same effect for the spring elements $5_1$, $5_2$ (and for the spring elements $5_3$, $5_4$ as well) the third and fourth spring elements $5_3$, $5_4$, (respectively the first and second spring elements $5_1$, $5_2$) may be omitted, resulting in the first oscillator 3 being clamped at one end (together with an appropriately modified electrode configuration, not shown). In such a situation, the second oscillator 4 may also be attached to the first oscillator by further spring elements to achieve clamping at two ends.

A preferred embodiment of the Coriolis gyro of the invention as well as its method of operation will be described in more detail with reference to FIG. 3, a schematic illustration of a mass system comprising four linear oscillators with corresponding measurement and control loops for rotation rate and quadrature bias, as well as auxiliary control loops for compensation of the quadrature bias. The schematic layout of coupled system 1' comprises a first resonator $70_1$ and a second resonator $70_2$. The first resonator $70_1$ is coupled to the second resonator $70_2$ by a mechanical coupling element (a spring) 71. The first and the second resonator $70_1$, $70_2$ are formed in a common substrate and may be caused to oscillate in antiphase with respect to one another along a common oscillation axis 72. The first and the second resonators $70_1$, $70_2$ are identical, and are mapped onto one another via an axis of symmetry 73. The design of the first and second resonators $70_1$, $70_2$ has been explained in conjunction with FIGS. 1 and 2 and will therefore not be explained again. (Identical and mutually corresponding components or component groups are identified by the same reference numbers with identical components associated with different resonators being identified by different indices.)

Figure 3:
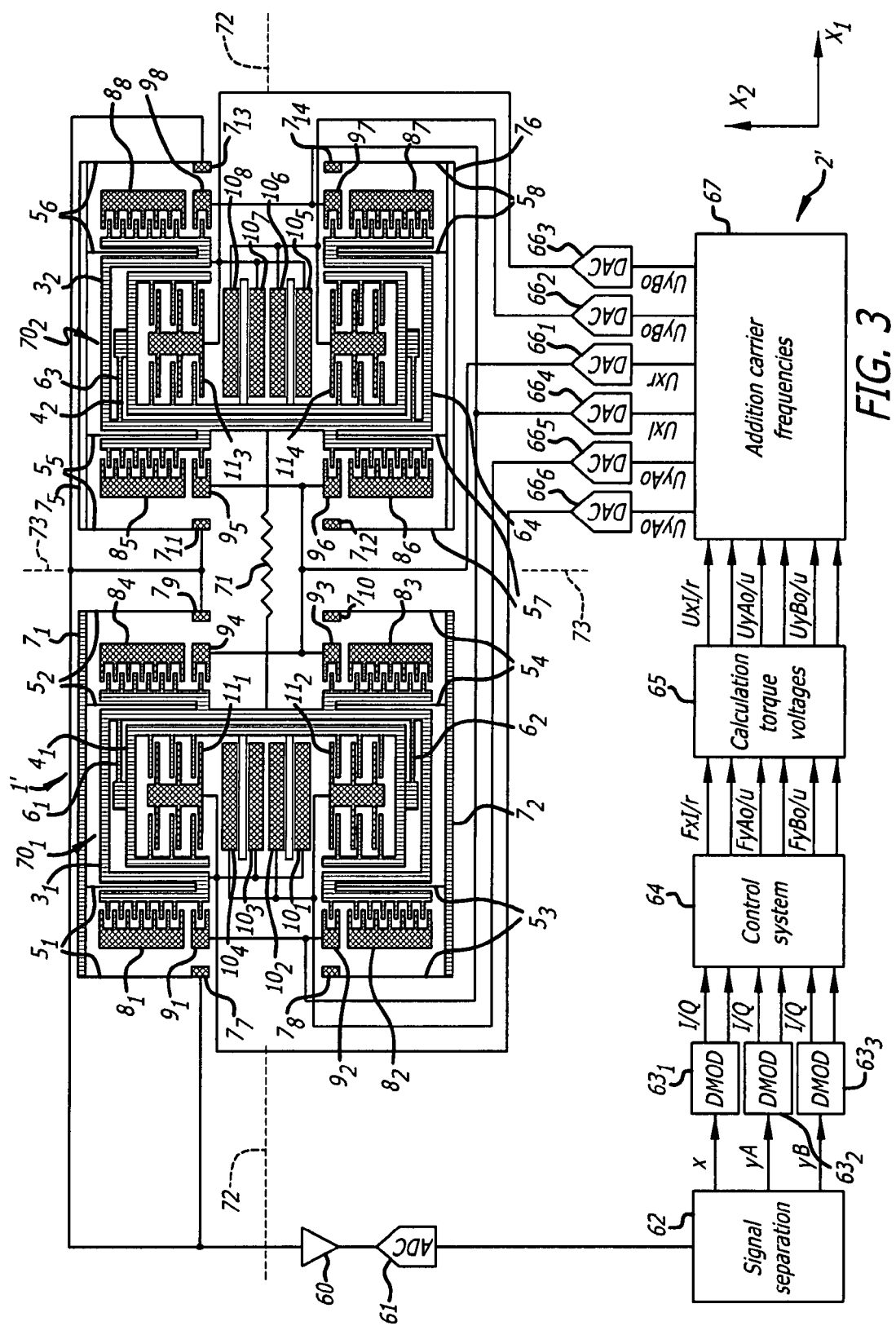
FIG. 3 is a schematic illustration of a mass system in accordance with an embodiment of the invention, which comprises four linear oscillators, with corresponding measurement and control loops for a rotation rate Ω and a quadrature bias $B_Q$, as well as auxiliary control loops for compensation of the quadrature bias.

A major difference between the double oscillators shown in FIG. 3 and those in FIGS. 1 and 2 is that some of the individual electrodes are physically combined to form one overall electrode. For example, the individual electrodes identified by the reference numbers $8_1$, $8_2$, $9_1$ and $9_2$ in FIG. 3 form a common electrode. Further, the individual electrodes identified by the reference numbers $8_3$, $8_4$, $9_3$ and $9_4$ form a common electrode, those with the reference numbers $10_4$, $10_2$, $11_2$ as well as the reference numbers $11_1$, $10_3$ and $10_1$ each form an overall electrode. The same applies in an analogous manner to the other double-oscillator system.

During operation of the coupled system 1' in accordance with the invention, the two resonators $70_1$, $70_2$ oscillate in antiphase along the common oscillation axis 72. The coupled system 1' is thus not susceptible to external disturbances or to those emitted by the coupled system 1' itself into the substrate in which the resonators $70_1$ and $70_2$ are mounted.

When the coupled system 1' is rotated, the second oscillators $4_1$ and $4_2$ are deflected in mutually opposite directions (i.e., the X2 direction and opposite to the X2 direction). When an acceleration of the coupled system 1' occurs, the second oscillators $4_1$, $4_2$ are each deflected in the same direction, i.e., in the same direction as the acceleration provided that such acceleration is in the X2 direction, or in the opposite direction. Accelerations and rotations can thus be measured simultaneously or selectively. Quadrature bias compensation can be carried out during the measurement process in the resonators $70_1$, $70_2$. However, this is not absolutely essential.

In principle, it is possible to operate the coupled system 1' on the basis of the evaluation/excitation electronics 2 described with reference to FIGS. 1 and 2. An alternative method (carrier frequency method) is instead used in the embodiment of FIG. 3. Such operating method will be described below.

The evaluation/excitation electronics 2 identified by the reference number 2' include three control loops: a first control loop for excitation and/or control of an antiphase oscillation of the first oscillators $3_1$ and $3_2$ along the common oscillation axis 72, a second control loop for resetting and compensation of the oscillations of the second oscillator $4_1$ along the X2 direction, and a control loop for resetting and compensation of the oscillations of the second oscillator $4_2$ along the X2 direction. The three described control loops include an amplifier 60, an analog/digital converter 61, a signal separation module 62, a first to third demodulation module $63_1$ to $63_3$, a control module 64, an electrode voltage calculation module 65, a carrier frequency addition module 67, and a first to sixth digital/analog converter $66_1$ to $66_6$.

Carrier frequencies can be applied to the electrodes $8_1$ to $8_8$, $9_1$ to $9_8$, $10_1$ to $10_8$ and $11_1$ to $11_4$ for tapping excitation of the antiphase oscillation or of the oscillations of the second oscillators $4_1$, $4_2$. This may be accomplished in a number of ways. They include a) using three different frequencies, with one frequency associated with each control loop, b) using square-wave signals with a time-division multiplexing method, and c) using random phase scrambling (stochastic modulation method).

The carrier frequencies are applied to the electrodes $8_1$ to $8_8$, $9_1$ to $9_8$, $10_1$ to $10_8$ and $11_1$ to $11_4$ via the associated signals UyAo, UyAu (for the second oscillator $4_1$) Uxl, Uxr (for the antiphase resonance of the first oscillators $3_1$ to $3_2$) and UyBu and UyBo (for the second oscillator $4_2$), that are produced in the carrier frequency addition module 67 and excited in antiphase with respect to the abovementioned frequency signals. The oscillations of the first and second oscillators $3_1$, $3_2$, $4_1$ and $4_2$ are tapped off via those parts of the gyro frame identified by the reference numbers $7_7$, $7_9$, $7_{11}$ and $7_{13}$, (used as tapping electrodes in addition to their function as suspension points for the mass system). For this, the two resonators $70_1$, $70_2$ are preferably designed to be electrically conductive, with all of the frames, springs and connections. The signal, tapped off by means of the gyro frame parts $7_7$, $7_9$, $7_{11}$ and $7_{13}$ and supplied to the amplifier 60, contains information about all three oscillation modes. It is converted by the analog/digital converter 61 to a digital signal supplied to the signal separation module 62.

The assembled signal is separated into three different signals in the signal separation module 62: x (which contains information about the antiphase oscillation), yA (which contains information about the deflection of the second oscillator $4_1$) and yB (which contains information about the deflection of the second oscillator $4_2$). The signals are separated differently in accordance with the type of carrier frequency method used (see a) to c) above). Separation is carried out by demodulation with the corresponding signals of the carrier frequency method. The signals x, yA and yB are supplied to the demodulation modules $63_1$ to $63_3$ that demodulate them with an operating frequency of the antiphase oscillation for 0° and 90°. The control module 64 and the electrode voltage calculation module 65 for regulation/calculation of the signals Fxl/r or Uxl/r, respectively, are preferably configured analogously to the electronics module 2 of in FIG. 1. The control module 64 and the electrode voltage calculation module 65 (for regulation/calculation of the signals FyAo/u, UyAo/u, and FyBo/u, UyBo/u) are preferably designed analogously to the electronics module 2 of FIG. 2.

Figure 4A:
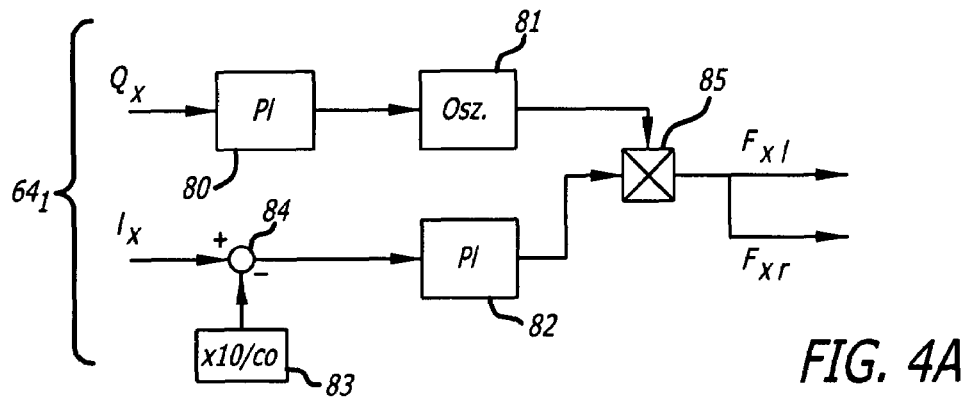
FIG. 4 is a block diagram of an embodiment of a control system for incorporation into a mass system in accordance with that illustrated in FIG. 3 above.
Figure 4B:
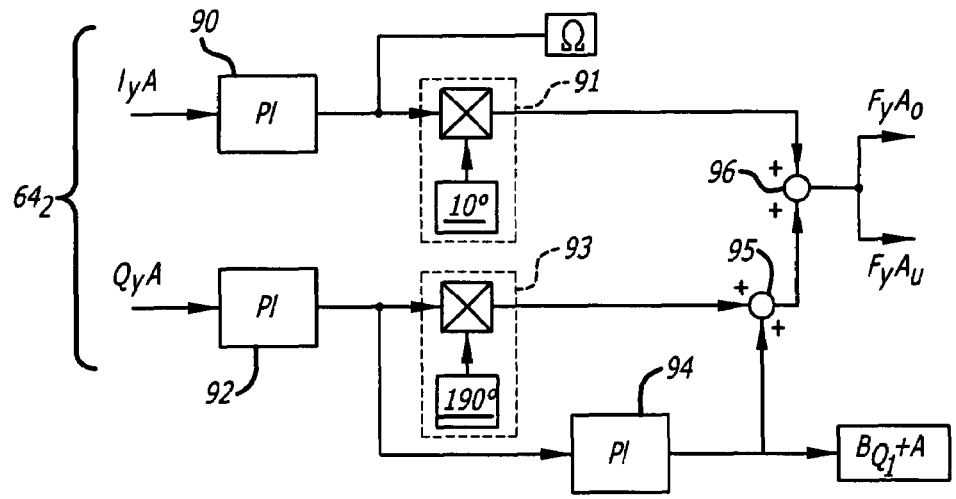
Figure 4C:
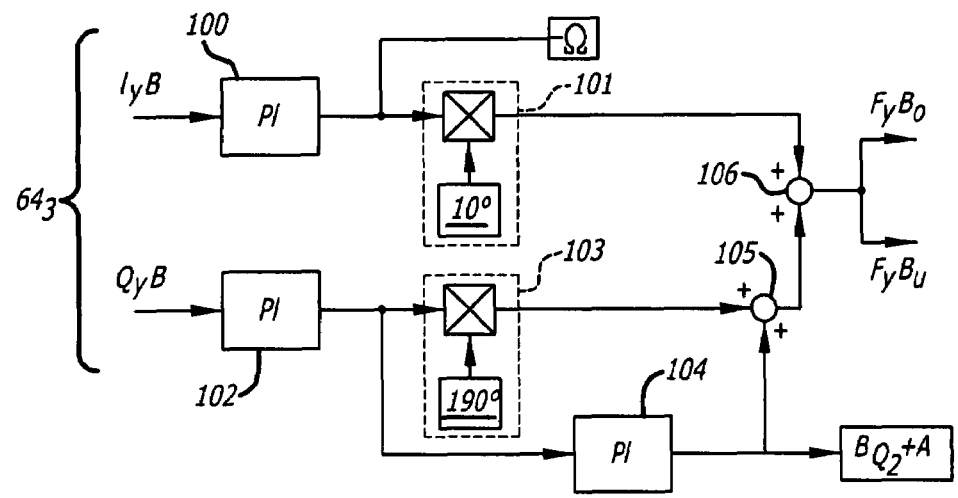

FIG. 4 is a block diagram of an embodiment of a control system for incorporation into a mass system in accordance with FIG. 3. It shows one preferred embodiment of the control system identified by the reference number 64 in FIG. 3. The control system 64 includes a first to third part $64_1$ to $64_3$. The first part $64_1$ has a first regulator 80, a frequency generator 81, a second regulator 82, an electronics component 83, an addition stage 84 and a multiplier 85. The operation of the first part corresponds essentially to that of the electronics module 2 of FIG. 1 and will therefore not be described once again. The second part $64_2$ has a first regulator 90, a first modulator 91, a second regulator 92, a second modulator 93 and a third regulator 94. A first and a second addition stage 95, 96 are also provided. A rotation rate signal $\Omega$ can be determined at the output of the first regulator 90, and an assembled signal comprising the compensation of the quadrature bias $B_{Q1}$ and an acceleration A can be determined at the output of the third regulator 94.

The third part $64_3$ of the control system 64 has a first regulator 100, a first modulator 101, a second regulator 102, a second modulator 103 and a third regulator 104. A first and a second addition stage 105, 106 are also provided. A rotation rate signal $\Omega$ with negative mathematical sign can be tapped off at the output of the first regulator 100 and an assembled signal comprising the compensation of the quadrature bias $B_{Q2}$ with negative mathematical sign and an acceleration signal A can be tapped off at the output of the third regulator 104. The method of operation of the second and of the third parts 642 and 643 corresponds to that of the electronics module 2 illustrated in FIG. 2, and will therefore not be explained again.

Only the signals for resetting rotation rate and quadrature, after multiplication by the operating frequency, are passed, together with the DC voltages for the quadrature auxiliary regulator, to a combined electrode pair. The two signals are therefore added so that the calculation of the electrode voltages includes the reset signals for oscillation frequency and the DC signal for quadrature regulation. The electrode voltages Uxl/r, UyAo/u and UyBo/u thusly calculated are then added to the carrier frequency signals and jointly passed via the analog/digital converters $66_1$ to $66_6$ to the electrodes.

The carrier frequency methods described above with antiphase excitation have the advantage that a signal is applied to the amplifier 60 only when the linear oscillators $3_1$, $3_2$, as well as $4_1$ and $4_2$, are deflected. The frequency signals used for excitation may be discrete frequencies or square-wave signals. Square-wave excitation is preferred, as it is easier to produce and process.

A number of analyses relating to measurement accuracy of the acceleration measurement method according to the invention are described in the following text.

Rotation rate results in an antiphase deflection of the oscillators $4_1$ and $4_2$ at the operating frequency of the Coriolis gyro. In contrast, acceleration results in in-phase deflection of the oscillators $4_1$ and $4_2$ with the acceleration measured in the frequency range from 0 Hz to about 500 Hz with a measurement accuracy of 50 mg to 50 μg.

The in-phase deflection to be measured is given by:

$$\alpha = \frac{a}{l \cdot \omega^2}$$

α Deflection angle
a Acceleration
t Length of the spring
ω Natural frequency of the oscillators $4_1$ to $4_2$.

For typical natural frequencies $\omega=2*\pi f=6000$ rad/s to 60000 rad/s and spring lengths of l=1 mm of Coriolis gyros, the measurement accuracy of, for example 5 mg is:

$\alpha=1.4*10^{-6}$ to $1.4*10^{-8}$ rad or $x_2=x_1=1.4$ nm to 14 pm.

Small deflections such as the above are difficult to measure in the frequency range from 0 to 500 Hz. At a minimum, additional electronic complexity is required for the multi-sensor according to the invention as the electronics have to measure very accurately in both the operating range of the gyro function (rotation rate measurement) from 1 to 10 KHz and in the operating range for measurement of the acceleration from 0 to 500 Hz.

This disadvantage can be overcome in the invention by using the quadrature regulation, as described above, for a mass system comprising two linear oscillators (FIGS. 1 and 2) for the mass system composed of four linear oscillators (FIG. 3): the acceleration detunes the orthogonality error, resulting in an in-phase quadrature signal, clearly seen, at the operating frequency in the oscillators $4_1$ and $4_2$:

$$\Omega_Q = \frac{a_Q}{a_s} \cdot \frac{\omega}{2} = \alpha \frac{\omega}{2}$$

In this case, $\Omega_Q$ is the quadrature rotation rate, $a_Q$ is the quadrature acceleration and $a_s$ is the oscillator acceleration.

For a measurement accuracy of, for example 5 mg ($\alpha=1.4.10^{-6}$ rad), this results in:

$$\Omega_Q = 0.0042 \frac{rad}{s} = 0.25°/s = 866°/h$$

at a natural frequency of 1 kHz $$\Omega_Q = 4.2 \cdot 10^{-5} \frac{rad}{s} \bigg/ 0.0025°/s = 8.7°/h$$

at a natural frequency of 10 kHz

For a rotation rate sensor of 5°/h, the quadrature rotation rate of 866°/h can be verified with certainty using the same electronics. In contrast at the natural frequency of 10 KHz and with the quadrature rotation rate of 8.7°/h, the verification limit of the rotation rate sensor of 5°/h is virtually exhausted. Although this measurement is also stable in the long run, it depends on the long-term stability of the quadrature rotation rate. The actual quadrature rotation rate is an antiphase signal. The stability of the acceleration measurement therefore depends on the difference in the quadrature rotation rates from the oscillator $4_1$ to the oscillator $4_2$, and their stability. Since the two oscillators are located close to one another and were manufactured in one process step, it is predicted that it is possible to cover a range with low accuracy from 50 mg to 50 μg.

While this invention has been described with reference to its presently preferred embodiment, it is not limited thereto. Rather, the invention is limited only insofar as it is defined by the following set of patent claims and includes within its scope all equivalents thereof.

The invention claimed is:

1. A Coriolis gyro, having a first and a second resonator, which are each in a form of a coupled system comprising a first and a second linear oscillator, with the first resonator being mechanically and/or electrostatically connected and/or coupled to the second resonator such that the first and second resonators can be caused to oscillate in antiphase with one another along a common oscillation axis, in which case the first oscillators are each connected by means of first spring elements to a gyro frame of the Coriolis gyro, and the second oscillators are each connected by second spring elements to one of the first oscillators, and the Coriolis gyro furthermore has:

a device for production of electrostatic fields, by means of which an alignment angle of the first spring elements with respect to the gyro frame can be varied, and/or an alignment angle of the second spring elements with respect to the first oscillators can be varied, a device by means of which it is possible to determine first signals for the rotation rate and quadrature bias, which occur within the first resonator, and second signals for the rotation rate and quadrature bias, which occur in the second resonator, control loops by means of which the alignment or strength of the electrostatic fields is regulated such that the first and the second quadrature bias are each as small as possible, and a computation unit, which uses the first and second signals to determine the rotation rate, and uses an in-phase component of the electrostatic fields which compensate for the first and second quadrature biases to determine an acceleration to be measured.

2. The Coriolis gyro as claimed in claim 1, characterized in that the configurations of the first and of the second resonator are identical, with the resonators being arranged axially symmetrically with respect to one another with respect to an axis of symmetry which is at right angles to the common oscillation axis.

3. A method for selective or simultaneous measurement of rotation rates and accelerations using a rotation rate Coriolis gyro which has a first and a second resonator which are each in a form of a coupled system comprising a first and a second linear oscillator, with the rotation rates being determined by tapping and evaluation of deflections of the second oscillators, having the following steps:

the first and second resonators are caused to carry out oscillations in antiphase with one another along a common oscillation axis, the deflections of the second oscillators are compared with one another in order to determine an antiphase deflection component which is a measure of the rotation rate to be measured and/or in order to determine a common in-phase deflection component, which is a measure of the acceleration to be measured, calculation of the rotation rate or acceleration to be measured from the in-phase deflection component or antiphase deflection component, in which case the common in-phase deflection component is determined as follows:

a first quadrature bias is determined which occurs within the first resonator, a second quadrature bias is determined which occurs within the second resonator, the first quadrature bias is calculated using the second quadrature bias in order to determine a common quadrature bias component which is proportional to the acceleration to be measured and represents the common in-phase deflection component.

4. The method as claimed in claim 3, characterized in that electrostatic fields are produced in order to vary the mutual alignment of the first and second oscillators, with the alignment or strength of the electrostatic fields being regulated such that the first and the second quadrature bias are each as small as possible.

* * * * *